United States Patent [19]
Lange

[11] 4,104,044
[45] Aug. 1, 1978

[54] BIDIRECTIONAL FLOW FILTER-DRIER ASSEMBLY

[75] Inventor: Harold T. Lange, St. Louis, Mo.

[73] Assignee: Sporlan Valve Company, St. Louis, Mo.

[21] Appl. No.: 789,360

[22] Filed: Apr. 21, 1977

Related U.S. Application Data

[63] Continuation-in-part of Ser. No. 729,670, Oct. 5, 1976, Pat. No. 4,029,580.

[51] Int. Cl.² .................. B01D 39/02; F25B 13/00
[52] U.S. Cl. ............................... 62/324; 62/474; 210/136; 210/502; 210/DIG. 6
[58] Field of Search .................. 62/85, 324, 474; 210/136, DIG. 6, DIG. 7, 502

[56] References Cited

U.S. PATENT DOCUMENTS

| | | | |
|---|---|---|---|
| 2,134,413 | 10/1938 | Munoz | 210/136 |
| 2,702,993 | 3/1955 | Harris | 62/474 X |
| 3,025,233 | 3/1962 | Figert | 210/502 |
| 3,178,022 | 4/1965 | Balogh | 210/136 |
| 3,815,752 | 6/1974 | Hoffman et al. | 210/266 |

*Primary Examiner*—Frank A. Spear, Jr.
*Assistant Examiner*—Richard W. Burks
*Attorney, Agent, or Firm*—Cohn, Powell & Hind

[57] ABSTRACT

A filter-drier assembly adapted for bidirectional flow in heat pump systems. The filter-drier assembly includes a pair of bypass lines in the liquid line, each bypass line circumventing one of the expansion devices located in the liquid line. An expansion device is located ahead of the outdoor coil for use in one mode of operation and a second expansion device is located ahead of the indoor coil for use in the other mode of operation. A filter-drier unit is disposed in each bypass line, each filter-drier unit including a check valve enabling flow through the associated bypass line and filter-drier unit in one direction and precluding flow in the opposite direction. The check valve of each filter-drier unit precludes flow in the bypass line when its associated expansion device is operable in one mode of operation. The filter-drier unit includes a shell provided with an inlet and an outlet, and filtering and drying elements in the shell between the inlet and outlet. The check valve is connected to the outlet to enable flow through the shell and through the filtering and drying elements from inlet to outlet and to preclude reverse flow.

4 Claims, 4 Drawing Figures

BIDIRECTIONAL FLOW FILTER-DRIER ASSEMBLY

CROSS-RELATED APPLICATION

This application is a continuation-in-part of co-pending application Ser. No. 729,670, filed Oct. 5, 1976 now U.S. Pat. No. 4,029,580, dated 6/14/77.

BACKGROUND OF THE INVENTION

This invention relates to improvements in a bidirectional flow filter-drier assembly for use in the liquid line of reverse-cycle refrigeration and air-conditioning systems, more commonly known as heat pumps.

There are many filter-driers in existence which have been and can be used in heat pumps, but these filter-driers are designed for refrigerant flow in one direction only so that if there is a backflow, solid contaminants that were picked up in the forward flow direction are released to the system. Consequently, the use of these existing filter-driers requires the use of additional bypass valves and piping that restrict flow in one direction.

Of course, an alternative to installing the existing filter-drier in the liquid line of a heat pump system, would be to install such filter-drier in the common suction line. However, such a filter-drier would have to be materially larger in size to minimize pressure drop because it would be handling vapor rather than liquid flow. In any event, many system designers prefer the filter-drier to be located in the liquid line to protect the expansion valves. These existing filter-driers cannot be back-flowed without detrimental effects, and their use in the liquid line requires additional bypass valves, and their use in the suction line requires an oversized unit and leaves the expansion devices directly unprotected from contamination.

SUMMARY OF THE INVENTION

The present filter-drier assembly can be used in the liquid line of a heat pump system without requiring additional bypass valves, and does not result in the release of any contaminants, previously removed, back into the system upon reversal of liquid flow.

The filter-drier unit includes the provision of filtering and drying means in a shell between an inlet and an outlet, and the provision of a check valve means connected to the outlet to enable flow through the shell and the filtering and drying means from inlet to outlet, and to preclude reverse flow.

More particularly, a first fitting is attached to one end of the shell, the first fitting providing the inlet, and a second fitting is attached to the opposite end of the shell, the second fitting providing the outlet. The check valve means is mounted in the second fitting to allow flow through the outlet in one direction outwardly of the shell and to preclude flow through the outlet in the opposite direction into the shell.

The filter-drier assembly is utilized in a heat pump system in which a compressor is connected by mode-switching valve means to an outdoor coil and an indoor coil, a liquid line interconnects the coils, and first and second expansion devices are located in the liquid line, the first expansion device being located ahead of the outdoor coil for use in one mode of operation, and the second expansion device being located ahead of the indoor coil for use in the other mode of operation. The assembly includes a pair of bypass lines in the liquid line, each bypass line circumventing one of the expansion devices. A filter-drier unit is disposed in each bypass line, each filter-drier unit including a check valve means enabling flow through the associated bypass line and filter-drier unit in one direction and precluding flow in the opposite direction.

In the assembly, the check valve means of one filter-drier unit in the bypass line across the second expansion valve enables flow only in a direction compatible with flow through the first expansion device in one mode of operation, and the check valve means of the other filter-drier unit in the bypass line across the first expansion device enables flow only in a direction compatible with flow through the second expansion device in the other mode of operation.

DESCRIPTION OF THE PREFERRED EMBODIMENT

Figure 1:
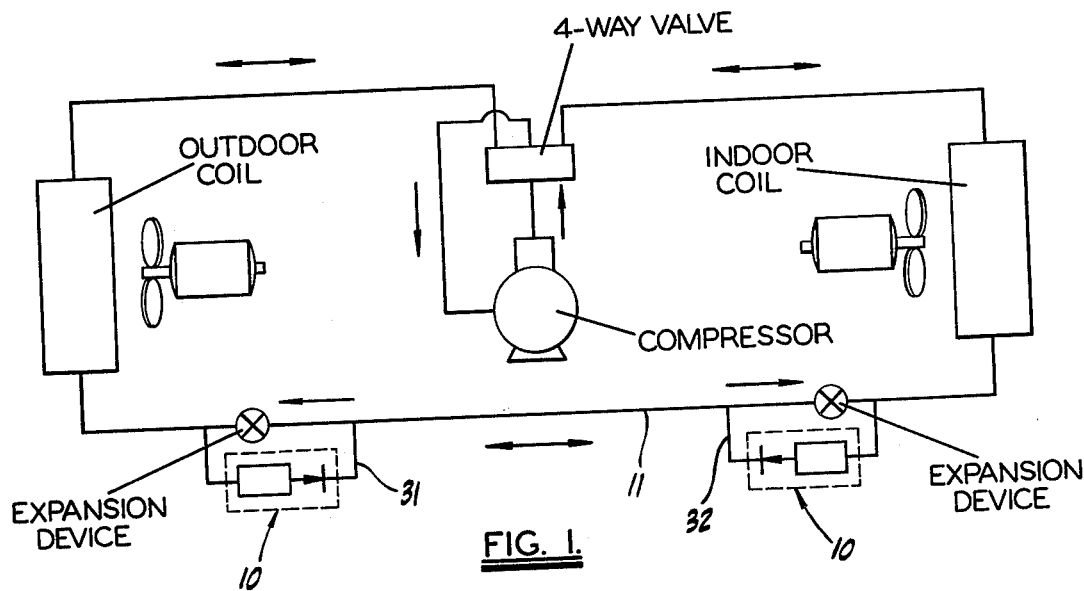
FIG. 1 is a diagram of a heat pump system utilizing the present filter-drier assembly in the liquid line.

Referring now by characters of reference to the drawing, and first to FIG. 1, it will be understood that the heat pump system in which the present filter-drier unit 10 and filter-drier assembly can be used, includes a compressor connected through a four way valve to an outdoor coil and an indoor coil, the outdoor and indoor coils being interconnected by a liquid line 11. A pair of expansion devices are located in the liquid line 11, a first such expansion device being located ahead of the outdoor coil for use in one mode of operation and a second such expansion device being located ahead of the indoor coil for use in the other mode of operation. The filter-drier units 10, in assembly, are located in the liquid line 11 so as to provide protection for both expansion devices.

Figure 2:
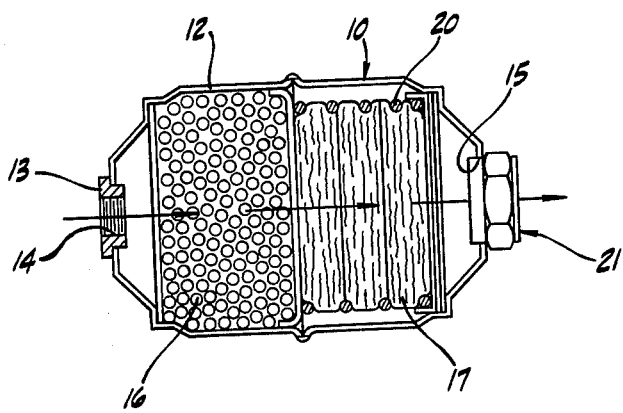
FIG. 2 is a longitudinal cross-sectional view of the filter-drier unit.

One embodiment of the filter-drier unit 10 is illustrated in FIG. 2. The filter-drier unit 10 may be of any suitable construction such as that disclosed in U.S. Pat. No. 3,025,233 or in U.S. Pat. No. 3,815,752 or in co-pending application Ser. No. 729,670. The filter-drier unit 10 in FIG. 2 is fully disclosed in co-pending application Ser. No. 729,670, and such detailed description is incorporated by reference.

Briefly, the filter-drier means 10 includes a shell 12 having a fitting 13 providing an inlet 14 at one end and an outlet 15 at the other end. An adsorbent material bed 16 is contained in the shell 12 adjacent the housing inlet 14. A filter media of inorganic fibrous material 17 is disposed in a wire form 20 extending substantially to and between the adsorbent material bed 16 and the housing outlet 15.

Disposed in the outlet 15 of filter-drier means 10 is a check valve means 21 that enables flow only through the shell 12 and the filtering and drying means 16–17 from inlet 14 to outlet 15, and precludes backflow into the shell 12 through the outlet 15.

Figure 3:
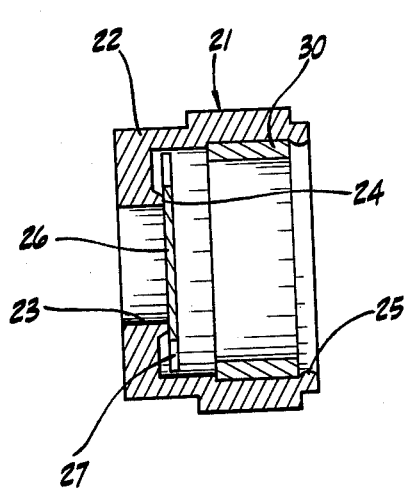
FIG. 3 is an enlarged longitudinal cross-sectional view of the check valve assembly utilized in the filter-drier unit of FIG. 2.
Figure 4:
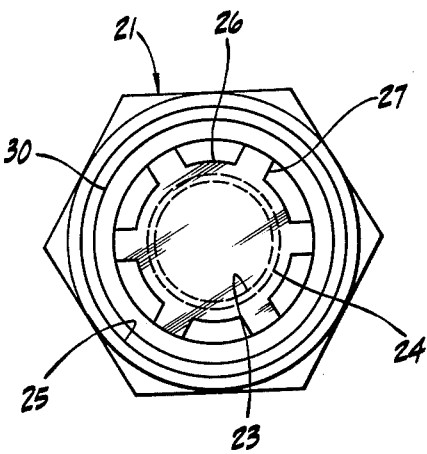
FIG. 4 is an end view of the check valve assembly from the right of FIG. 3.

The details of construction of the check valve means 21 are best shown in FIGS. 3 and 4 and are fully disclosed in copending application Ser. No. 729,670, and such detailed description is incorporated by reference. The check valve means 21 includes a tubular fitting 22 provided with an inlet valve port 23 at one end as defined by a valve seat 24, and an outlet 25 at the opposite end. Movably mounted in the tubular casing 22 and selectively engaging the valve seat 24 under liquid pressure, is a valve plate 26. The valve plate 26 is provided with radially extending, peripherally spaced fingers 27. A cylindrical, tubular stop 30 is disposed in and attached to the tubular casing 22, the stop 30 engaging the valve plate fingers 27 to limit the movement of the valve plate 26 as it moves away from its valve seat 24 to open the valve port 23 under liquid pressure. When the valve port 23 is open, the flow is through the port 23, between the valve plate fingers 27 and past the stop 30 for discharge through the outlet 25. Liquid pressure on the opposite side of the valve plate 26 will move the valve plate 26 against the valve seat 24 and close the valve port 23, thereby preventing backflow in the associated filter-drier unit 10.

In the filter-drier assembly for the heat pump system disclosed in FIG. 1, a bypass line 31 is provided in the liquid line across the first expansion device ahead of the outdoor coil. One of the filter-drier units 10 is located in bypass line 31, and is disposed so that the check valve means 21 enables flow through the associated bypass line 31 and the filter-drier unit 10 in one direction and precludes flow in the opposite direction. Another bypass line 32 is provided across the second expansion device ahead of the indoor coil. A filter-drier unit 10 is located in bypass line 32, and is disposed so that the check valve means 21 enables flow in one direction and precludes flow in the opposite direction.

More particularly, the check valve means 21 of the filter-drier unit 10 in the bypass line 32 across the second expansion device ahead of the indoor coil enables flow only in a direction compatible with flow through the first expansion device ahead of the outdoor coil in one mode of operation, and the check valve means 21 of the other filter-drier unit 10 in the bypass line 31 across the first expansion device ahead of the outdoor coil enables flow only in a direction compatible with flow through the second expansion device ahead of the indoor coil in the other mode of operation.

It is thought that the operation of the filter-drier assembly has become apparent from the foregoing detailed description of parts, but for completeness of disclosure such operation will be briefly described.

It will first be assumed that the liquid flow in the liquid line 11 is to the right in FIG. 1 from the outdoor coil to the indoor coil in one mode of operation. The liquid flow from the outdoor coil will move through the bypass line 31 and its associated filter-drier unit 10 and bypass the associated first expansion valve. The liquid flow will then pass through the second expansion device ahead of the indoor coil. The check valve means 21 of the associated filter-drier unit 10 precludes flow through the bypass line 32 and the filter-drier unit 10 across the second expansion device.

Flow of the refrigerant liquid in the opposite direction in the liquid refrigerant line 11 from the indoor coil to the outdoor coil in the other mode of operation will cause liquid to enter the bypass line 32 and pass through the associated filter-drier unit 10 across the associated second expansion device, thereby bypassing such second expansion device. Further flow in the liquid line 11 passes through the first expansion device ahead of the outdoor coil. The check valve means 21 of the filter-drier unit 10 in the bypass line 31 across the first expansion device precludes flow through the bypass line 31 and filter-drier unit 10.

It will be apparent that in each mode of operation of the heat pump system, the refrigerant flow in the liquid line 11 passes through one or the other of the filter-drier units 10, and the appropriate expansion device for each mode of operation is fully operable.

I claim as my invention:

1. A filter-drier assembly for heat pump systems in which a compressor is connected by mode-switching valve means to an outdoor coil and an indoor coil, a liquid line interconnects the coils, and first and second expansion devices are located in the liquid line, the first expansion device being located ahead of the outdoor coil for use in one mode of operation, and the second expansion device being located ahead of the indoor coil for use in the other mode of operation, comprising:
    (a) a pair of bypass lines in the liquid line, each bypass line circumventing one of the expansion devices, and
    (b) a filter-drier unit in each bypass line, each filter-drier unit including a check valve means enabling flow through the associated bypass line and filter-drier unit in one direction and precluding flow in the opposite direction.

2. A filter-drier assembly for heat pump systems as defined in claim 1, in which:
    (c) the check valve means of one filter-drier unit in the bypass line across the second expansion device enables flow only in a direction compatible with flow through the first expansion device in one mode of operation, and
    (d) the check valve means of the other filter-drier unit in the bypass line across the first expansion device enables flow only in a direction compatible with flow through the second expansion device in the other mode of operation.

3. A filter-drier assembly for heat pump systems as defined in claim 2, in which:
    (e) each filter-drier unit includes:
        (1) a shell provided with an inlet and an outlet,
        (2) filtering and drying means in the shell between the inlet and outlet, and
        (3) the check valve means is connected to the outlet to enable flow through the shell and the filtering and drying means from inlet to outlet and to preclude reverse flow.

4. A filter-drier assembly for heat pump systems as defined in claim 3, in which:
    (f) a first fitting is attached to one end of the shell of each filter-drier unit, the first fitting providing the inlet,
    (g) a second fitting is attached to the opposite end of the shell of each filter-drier unit, the second fitting providing the outlet, and
    (h) the check valve means of each filter-drier unit is mounted in the second fitting to allow flow through the outlet in one direction outwardly of the shell and to preclude flow through the outlet in the opposite direction into the shell.

* * * * *